(12) United States Patent
Weaver et al.

(10) Patent No.: US 8,764,606 B2
(45) Date of Patent: Jul. 1, 2014

(54) ROLLING NEUTRAL MODE CONTROL SYSTEMS AND METHODS

(75) Inventors: Richard A. Weaver, Brighton, MI (US); Kenneth K. Lang, Saline, MI (US)

(73) Assignee: GM Global Technology Operations LLC

( * ) Notice: Subject to any disclaimer, the term of this patent is extended or adjusted under 35 U.S.C. 154(b) by 465 days.

(21) Appl. No.: 13/151,692

(22) Filed: Jun. 2, 2011

(65) Prior Publication Data

US 2012/0304960 A1 Dec. 6, 2012

(51) Int. Cl.
*B60W 10/02* (2006.01)
*B60W 10/06* (2006.01)

(52) U.S. Cl.
USPC .......................................................... 477/77

(58) Field of Classification Search
CPC .... B60W 10/02; B60W 10/06; B60W 10/113
USPC .................. 477/77, 80, 84, 175, 180, 181
See application file for complete search history.

(56) References Cited

U.S. PATENT DOCUMENTS

| | | | | |
|---|---|---|---|---|
| 2008/0223334 A1* | 9/2008 | Buslepp et al. | ........... | 123/325 |
| 2011/0015037 A1* | 1/2011 | Koenig | ........... | 477/121 |
| 2011/0257854 A1* | 10/2011 | Whitney et al. | ........... | 701/54 |

* cited by examiner

*Primary Examiner* — Edwin A Young

(57) ABSTRACT

An engine control module includes a deceleration fuel cutoff (DFCO) module, an actuator control module, and a rolling neutral (RN) module. The DFCO module determines whether to disable provision of fuel to an engine when a vehicle speed is greater than zero and selectively generates a DFCO signal based on the determination. The actuator control module disables the provision of fuel to the engine when the DFCO signal is generated. The RN module selectively generates an RN mode signal in response to a determination that the DFCO module is not generating the DFCO signal. The actuator control module controls the provision of fuel to the engine based on a desired engine speed when the RN mode signal is generated. A transmission control module disengages first and second input clutches of a dual clutch transmission (DCT) to decouple the DCT from the engine when the RN mode signal is generated.

10 Claims, 8 Drawing Sheets

ROLLING NEUTRAL MODE CONTROL SYSTEMS AND METHODS

FIELD

The present application relates to internal combustion engines and more particularly to vehicle control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

The engine outputs torque to a transmission. The transmission may transfer torque to one or more wheels to propel the vehicle. In some vehicles, the transmission includes a dual clutch transmission (DCT). A DCT includes two input clutches: each clutch is associated with a respective input shaft. An odd gearset is coupled to one of the two input shafts, and an even gearset is coupled to the other of the two input shafts. At a given time between gear shifts, one of the two clutches receives drive torque while the other of the two clutches does not. In this manner, drive torque is transferred to one of the two input shafts and gearsets at the given time.

Gear synchronizers move along a shaft of the DCT to mechanically couple an output gear of one of the gearsets to an output shaft. Gear actuators control the positions and engagement of the synchronizers. While torque is being transferred to one of the two input shafts, an oncoming gear ratio associated with the other of the two input shafts may be mechanically coupled to the output shaft in anticipation of a gear shift. The gear shift from the current gear ratio to the oncoming gear ratio may be accomplished in a relatively short period by engaging one clutch and disengaging the other clutch.

SUMMARY

A system for a vehicle includes an engine control module and a transmission control module. The engine control module includes a deceleration fuel cutoff module, an actuator control module, and a rolling neutral (RN) module. The DFCO module determines whether to disable provision of fuel to an engine when a vehicle speed is greater than zero and selectively generates a DFCO signal based on the determination. The actuator control module disables the provision of fuel to the engine when the DFCO signal is generated. The RN module selectively generates an RN mode signal in response to a determination that the DFCO module is not generating the DFCO signal. The actuator control module controls the provision of fuel to the engine based on a desired engine speed when the RN mode signal is generated. The transmission control module disengages first and second input clutches of a dual clutch transmission (DCT) to decouple the DCT from the engine when the RN mode signal is generated.

A method for a vehicle includes: determining whether to disable provision of fuel to an engine when a vehicle speed is greater than zero; selectively generating a deceleration fuel cutoff (DFCO) signal based on the determination; disabling the provision of fuel to the engine when the DFCO signal is generated; selectively generating a rolling neutral (RN) mode signal in response to a determination that the DFCO signal is not generated; controlling the provision of fuel to the engine based on a desired engine speed when the RN mode signal is generated; and disengaging first and second input clutches of a dual clutch transmission (DCT) to decouple the DCT from the engine when the RN mode signal is generated.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
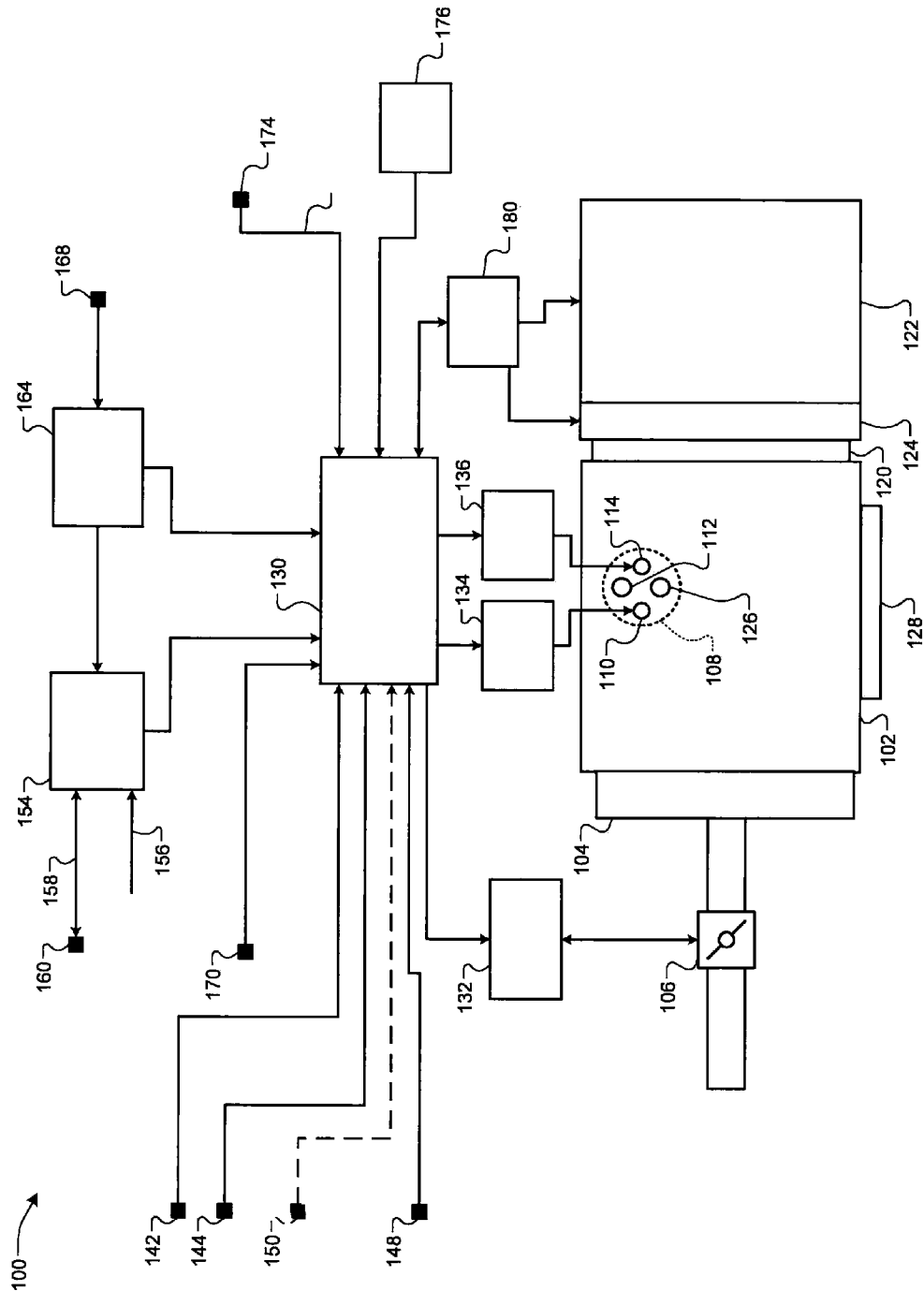
FIG. 1 is a functional block diagram of an example vehicle system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine control module (ECM) controls torque output by an engine. The engine outputs torque to a dual clutch transmission (DCT). The DCT includes two input shafts and two output shafts. A transmission control module (TCM) controls engagement and disengagement of first and second clutches to control the flow of torque between the engine and the input shafts. Under some circumstances, such as during vehicle deceleration, the ECM may selectively cut off fuel to the engine. Cutting off fuel to the engine during a vehicle deceleration event may be referred to as deceleration fuel cutoff (DFCO).

However, the ECM may determine that DFCO should not be performed under some circumstances. When the ECM determines that DFCO should not be performed, the ECM may selectively request operation in a rolling neutral (RN) mode. The TCM disengages both the first and second clutches during operation in the RN mode. Disengaging the first and second clutches de-couples the DCT from the engine.

While the DCT is de-coupled from the engine for operation in the RN mode, the ECM controls the engine based on a desired engine speed, such as an idle engine speed. Controlling the engine based on the desired engine speed may provide a fuel efficiency increase relative to normal engine operation at times when the ECM determines that DFCO should not be performed.

Referring now to FIG. 1, a functional block diagram of an example vehicle system 100 is presented. The vehicle system 100 includes an engine 102 that combusts an air/fuel mixture to produce drive torque for a vehicle. Air is drawn into an intake manifold 104 through a throttle valve 106. The throttle valve 106 regulates air flow into the intake manifold 104. Air within the intake manifold 104 is drawn into one or more cylinders of the engine 102, such as cylinder 108.

One or more fuel injectors, such as fuel injector 110, inject fuel that mixes with air to form an air/fuel mixture. In various implementations, one fuel injector may be provided for each cylinder of the engine 102. The fuel injectors may be associated with an electronic or mechanical fuel injection system, a jet or port of a carburetor, or another fuel injection system. The fuel injectors may be controlled to provide a desired air/fuel mixture for combustion, such as a stoichiometric air/fuel mixture.

An intake valve 112 opens to allow air into the cylinder 108. A piston (not shown) compresses the air/fuel mixture within the cylinder 108. In some engine systems, a spark plug 114 initiates combustion of the air/fuel mixture within the cylinder 108. In other types of engine systems, such as diesel engine systems, combustion may be initiated without the spark plug 114.

Combustion of the air/fuel mixture applies force to the piston, which rotatably drives a crankshaft (not shown). The engine 102 outputs torque via the crankshaft. A flywheel 120 (e.g., a dual mass flywheel or DMF) is coupled to the crankshaft and rotates with the crankshaft. Torque output by the engine 102 is selectively transferred to a dual clutch transmission (DCT) 122 via the flywheel 120 and a clutch pack 124.

A gear ratio (or drive ratio) that is engaged may be defined as the ratio of an input shaft speed of the DCT 122 to an output shaft speed of the DCT 122. The clutch pack 124 includes a first clutch and a second clutch. The first clutch is linked to a first input shaft, and the second clutch is linked to a second input shaft. The first and second input shafts may be implemented in a nested orientation. More specifically, one of the first and second input shafts may be located within the other of the first and second input shafts.

One of the first and second clutches may be engaged (e.g., with a housing of the clutch pack 124) at a given time when a gear shift is not occurring. When the first clutch is applied and receives torque output by the engine 102, torque is transferred to the first input shaft. Torque is transferred to the second input shaft when the second clutch is applied and receiving torque output by the engine.

An odd gearset is associated with the first input shaft. An even gearset is associated with the second input shaft. The odd gearset includes pairs of input gears and output gears (each pair referred to as a gearset) that, when engaged, provide odd numbered gear ratios, respectively. For example only, the odd gearset may include gearsets corresponding to a first gear, a third gear, a fifth gear, and a seventh gear in an example seven-speed DCT. The even gearset also includes pairs of input gears and output gears, but the even gearset provides even gears, such as a second gear, a fourth gear, and a sixth gear in an example seven-speed DCT. The numerical label attributed to a given gear ratio (e.g., first, second, third, etc.) may increase as the gear ratio (i.e., the ratio of the input gear to the output gear) decreases and vice versa.

The odd gearset is associated with a first output shaft, and the even gearset is associated with a second output shaft. The first and second output shafts are linked to a transmission output shaft via which the DCT 122 transfers torque to and from wheels of the vehicle. The DCT 122 allows torque to be transferred to the transmission output shaft via a currently engaged gear ratio (i.e., current gear ratio) while an oncoming (or target) gear ratio may be selected in anticipation of a gear shift to the oncoming gear ratio. A gear shift from the current gear ratio to the oncoming gear ratio may be accomplished in a short period by shifting which one of the first and second clutches receives drive torque.

Exhaust produced by combustion of the air/fuel mixture is expelled from the cylinder 108 via an exhaust valve 126. The exhaust is expelled from the cylinders to an exhaust system 128. The exhaust system 128 may treat the exhaust before the exhaust is expelled from the exhaust system 128. Although one intake and exhaust valve are shown and described as being associated with the cylinder 108, more than one intake and/or exhaust valve may be associated with each cylinder of the engine 102.

An engine control module (ECM) 130 controls the torque output of the engine 102. The ECM 130 may control the torque output of the engine 102 via various engine actuators. The engine actuators may include, for example, a throttle actuator module 132, a fuel actuator module 134, and a spark actuator module 136. The engine system 100 may also include other engine actuators such as a phaser actuator module that controls one or more camshaft phasers, a lift actuator module that controls variable valve lift, a boost actuator module that controls a boost device (e.g., a turbo charger or a supercharger), and/or one or more other engine actuators. The ECM 130 may also control the other engine actuators.

Each engine actuator controls an operating parameter based on a signal from the ECM 130. For example only, the throttle actuator module 132 may control opening of the throttle valve 106 based on a signal from the ECM 130. The fuel actuator module 134 may control amount and timing of fuel injection based on a signal from the ECM 130, and the spark actuator module 136 may control spark timing based on a signal from the ECM 130.

The ECM 130 may control the torque output of the engine 102 based on, for example, driver inputs and/or one or more other inputs. The driver inputs may include, for example, an accelerator pedal position (APP), a brake pedal position (BPP), and vehicle operation commands. An APP sensor 142 measures a position of an accelerator pedal (not shown) and generates the APP based on the position. A BPP sensor 144 measures a position of a brake pedal (not shown) and generates the BPP based on the position of the brake pedal.

The vehicle operation commands may be made via actuation of, for example, an ignition key, one or more ignition buttons/switches, and/or one or more suitable vehicle ignition system inputs 148. A driver may select a mode of operation for the vehicle using a mode selector 150. For example only, the mode selector 150 may include a button and/or a switch from which the driver can select one of a first (e.g., normal) operating mode and a second (e.g., sport).

In some implementations, the APP sensor 142 and the BPP sensor 144 may measure the position of the associated pedal and generate the APP and the BPP, respectively, based on the measured position of the associated pedal. In other implementations, the APP sensor 142 and the BPP sensor 144 may each include one or more switches and may generate the APP and the BPP, respectively, indicating whether the associated pedal is being actuated away from a predetermined resting position. While only the APP sensor 142 and the BPP sensor 144 are shown and described, one or more additional APP and/or BPP sensors may be provided.

A driver of the vehicle may apply brakes (not shown) of the vehicle by depressing the brake pedal from the predetermined resting position. For example only, the brakes may include drum brakes, disc brakes, and/or another suitable type of vehicle brakes. The driver may input a desire to accelerate the vehicle by depressing the accelerator pedal from the predetermined resting position.

The driver inputs may also include one or more cruise control inputs. A cruise control module 154 may provide cruise control inputs to the ECM 130 based on user inputs 156 and vehicle surroundings data 158. The user inputs 156 may include, for example, a speed set input, a cruise control on/off input, a resume speed input, and/or one or more suitable user inputs.

The vehicle surroundings data 158 may be provided by one or more transceivers 160. The transceivers 160 generate signals (e.g., radar, laser, etc.) that are used to locate and track the position of objects (e.g., other vehicles and other types of objects) that are in front of, behind, and/or beside the vehicle. The transceivers 160 provide reflected signals to the cruise control module 154 based on signals reflected back to the transceivers 160. The cruise control module 154 may identify objects that are in front of, behind, and/or beside the vehicle and determine the distance to one or more objects based on the reflected signals.

The cruise control module 154 may determine the path (e.g., lane) of the vehicle on a road surface based on reflected signals from one or more of the transceivers 160, based on data provided by a navigation module 164, and/or signals from one or more other suitable sources. The data from the navigation module 164 may be based on data from one or more exterior imaging devices 168 (e.g., cameras).

The imaging devices 168 may be implemented to capture images from in front of, beside, and/or behind the vehicle and generate imaging signals. The cruise control module 154 may determine the path of the vehicle based on one or more identifiers in the images, such as lane lines. The navigation module 164 may selectively display video images of in front of, beside, and/or behind the vehicle on one or more displays (not shown) of the vehicle. For example only, the navigation module 164 may display video of behind the vehicle in real time when the driver selects reverse using a park, reverse, neutral, drive lever (PRNDL) 170. At a given time, the PRNDL 170 may be positioned by a user of the vehicle, for example, in one of park, reverse, neutral, drive, or one of one or more forward drive positions.

The navigation module 164 may include or be used in conjunction with a global positioning system (GPS). The GPS may determine a location of the vehicle based on signals from various satellites. The navigation module 164 may determine a heading of the vehicle based on monitoring the location of the vehicle.

The ECM 130 may selectively make control decisions for the engine system further based on one or more measured parameters. A vehicle speed may be measured using a vehicle speed sensor 174. For example only, the vehicle speed may be determined or generated based on one or more measured wheel speeds, a transmission output shaft speed, and/or another suitable parameter indicative of vehicle speed. The ECM 130 may also obtain operating parameters measured using other sensors 176, such as oxygen in the exhaust, engine speed, engine coolant temperature, intake air temperature, mass air flowrate, oil temperature, manifold absolute pressure, and/or other suitable parameters.

A transmission control module (TCM) 180 controls the first and second clutches of the clutch pack 124. For example only, pressure of a hydraulic fluid applied to the first and second clutches may be controlled based on signals from the TCM 180 in electro-hydraulic clutch actuation systems. Mechanical force applied to the first and second clutches may be controlled based on the signals from the TCM 180 in electro-mechanical clutch actuation systems or in another suitable manner in other types of clutch actuation systems. The TCM 180 may also control the gear ratio selected within the DCT 122 and/or one or more other parameters.

The TCM 180 and the ECM 130 may communicate. While the ECM 130 and the TCM 180 are shown as being implemented separately, the ECM 130 and the TCM 180 may be implemented integrally within one circuit in various implementations. For example only, the TCM 180 and the ECM 130 may communicate to share parameters. The TCM 180 and the ECM 130 may communicate for one or more other reasons, such as performing a rolling neutral (RN) mode event.

For example only, the ECM 130 may request the TCM 180 to enter into an RN mode when the ECM 130 determines that a deceleration fuel cutoff (DFCO) mode can not be entered and one or more RN mode enabling conditions are satisfied. The TCM 180 may disengage both the first and second clutches, thereby decoupling the engine 102 from the DCT 122, during operation in the RN mode. The TCM 180 notifies the ECM 130 that the TCM 180 will enter the RN mode, and the ECM 180 controls the engine actuators to achieve a desired engine speed (e.g., approximately an idle speed) during operation in the RN mode.

Operating in the RN mode may provide a fuel efficiency increase (i.e., a decrease in fuel consumption) relative to operation without entering into the RN mode. However, the fuel efficiency increase may be less than a fuel efficiency increase that may be achieved if operating in the DFCO mode. During operation in the DFCO mode, the ECM 130 disables the provision of fuel to the engine 102. In contrast with operation in the RN mode, the TCM 180 may keep the DCT 122 coupled to the engine 102 during operation in the DFCO mode.

Figure 2:
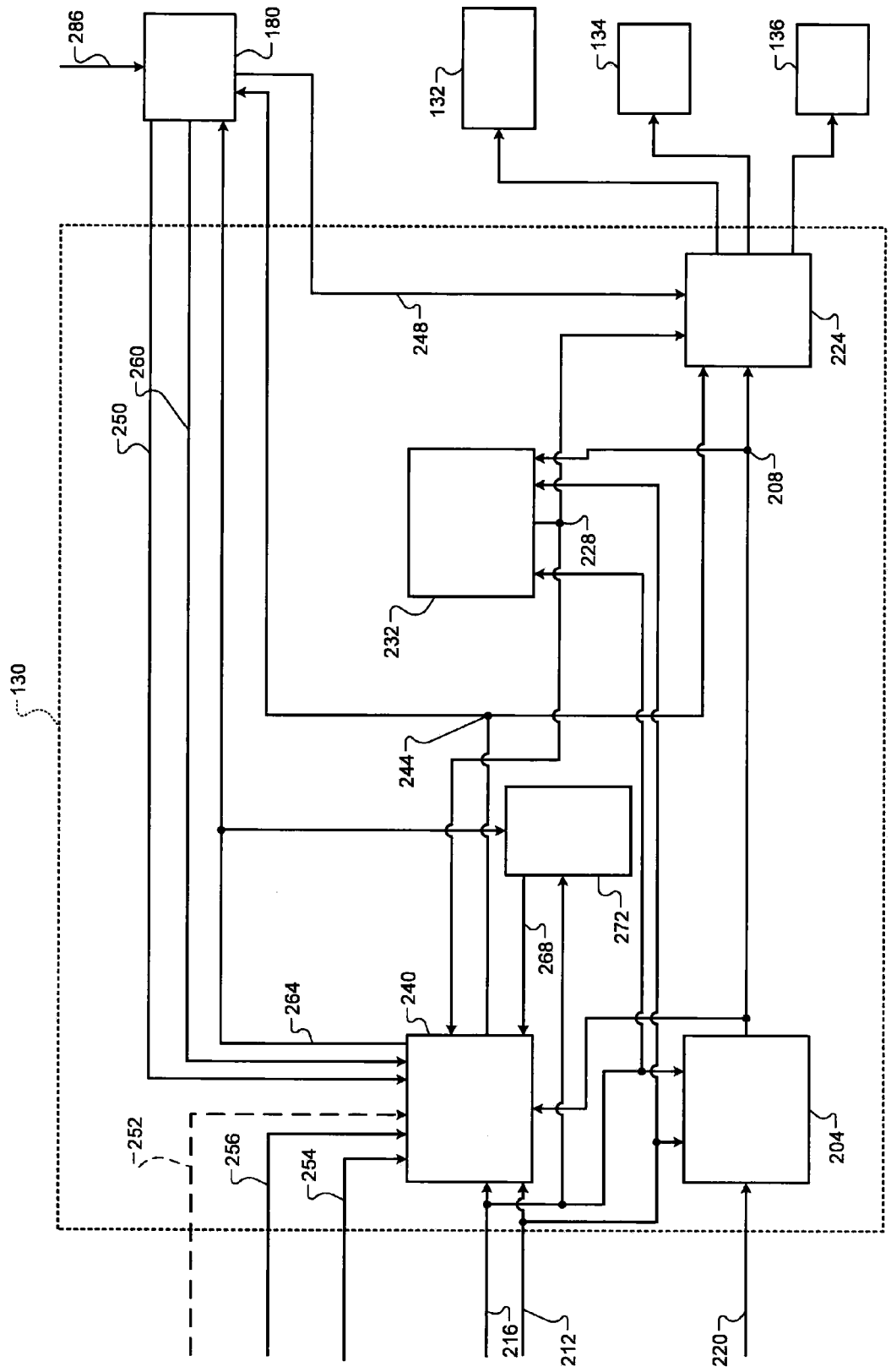
FIG. 2 is a functional block diagram of an example vehicle control system according to the present disclosure.

Referring now to FIG. 2, a functional block diagram of an example vehicle control system is presented. A torque request module 204 generates a torque request 208. The torque request module 204 may generate the torque request 208 based on an APP 212 and a vehicle speed 216. The torque request module 204 may generate the torque request 208 further based on a BPP 220 and/or one or more additional parameters. The APP 212 may be generated based on the APP measured by the APP sensor 142, and the BPP 220 may be generated based on the BPP measured by the BPP sensor 144. The vehicle speed 216 may be generated based on one or more measured wheel speeds and/or one or more other suitable parameters.

An actuator control module 224 may selectively control the engine actuators based on the torque request 208. For example only, the actuator control module 224 may control the engine actuators to produce a torque about the crankshaft of the engine 102 based on the torque request 208. For ease of discussion only, the actuator control module 224 is shown and described as controlling the throttle actuator module 132, the fuel actuator module 134, and the spark actuator module 136. However, the actuator control module 224 may also control the other engine actuators.

When a deceleration fuel cutoff (DFCO) signal 228 is in an active state, the actuator control module 224 may disable the provision of fuel to the engine 102. Disabling the provision of fuel to the engine 102 may be performed to, for example, increase fuel economy during vehicle deceleration. While the provision of fuel is disabled, the engine 102 continues to pump air through the cylinders. Drawing air into the engine 102, compressing air within the cylinders of the engine 102, and expelling air from the engine 102 may apply a braking (i.e., negative) torque on the crankshaft. In other words, torque losses attributable to engine pumping (i.e., pumping losses) occur when fueling is disabled for DFCO.

A DFCO module 232 may generate the DFCO signal 228. The DFCO module 232 may set the DFCO signal 228 to the active state when DFCO enabling conditions are satisfied. For example only, one of the DFCO enabling conditions may include the vehicle speed 216 being less than a predetermined speed. Whether the DFCO enabling conditions are satisfied may also be based on other suitable parameters, such as the torque request 208, the APP 212, and/or one or more other suitable parameters. For example only, the predetermined speed may be between approximately 20 miles per hour (mph) and approximately 30 mph or another suitable speed. The DFCO module 232 may set the DFCO signal 228 to an inactive state when one or more of the DFCO enabling conditions are not satisfied and/or one or more DFCO disabling conditions are satisfied. As stated above, the TCM 180 does not disengage the DCT 122 from the engine 102 when fueling is disabled for DFCO.

A rolling neutral (RN) enabling/disabling module 240 receives the DFCO signal 228. The RN enabling/disabling module 240 selectively enables and disables operation in an RN mode using an RN signal 244. For example only, the RN enabling/disabling module 240 may set the RN signal 244 to an active state to enable operation of the engine 102 in the RN mode and set the RN signal 244 to an inactive state to disable operation in the RN mode.

When the RN signal 244 is in the active state, the actuator control module 224 may control the engine actuators to achieve a desired RPM 248. When the RN signal 244 is in the inactive state, the actuator control module 224 may control the engine actuators, for example, to achieve the torque request 208. Controlling the engine actuators to achieve the desired RPM 248 allows the actuator control module 224 to reduce the fueling rate to approximately a predetermined minimum fueling rate that is greater than zero.

Figure 3:
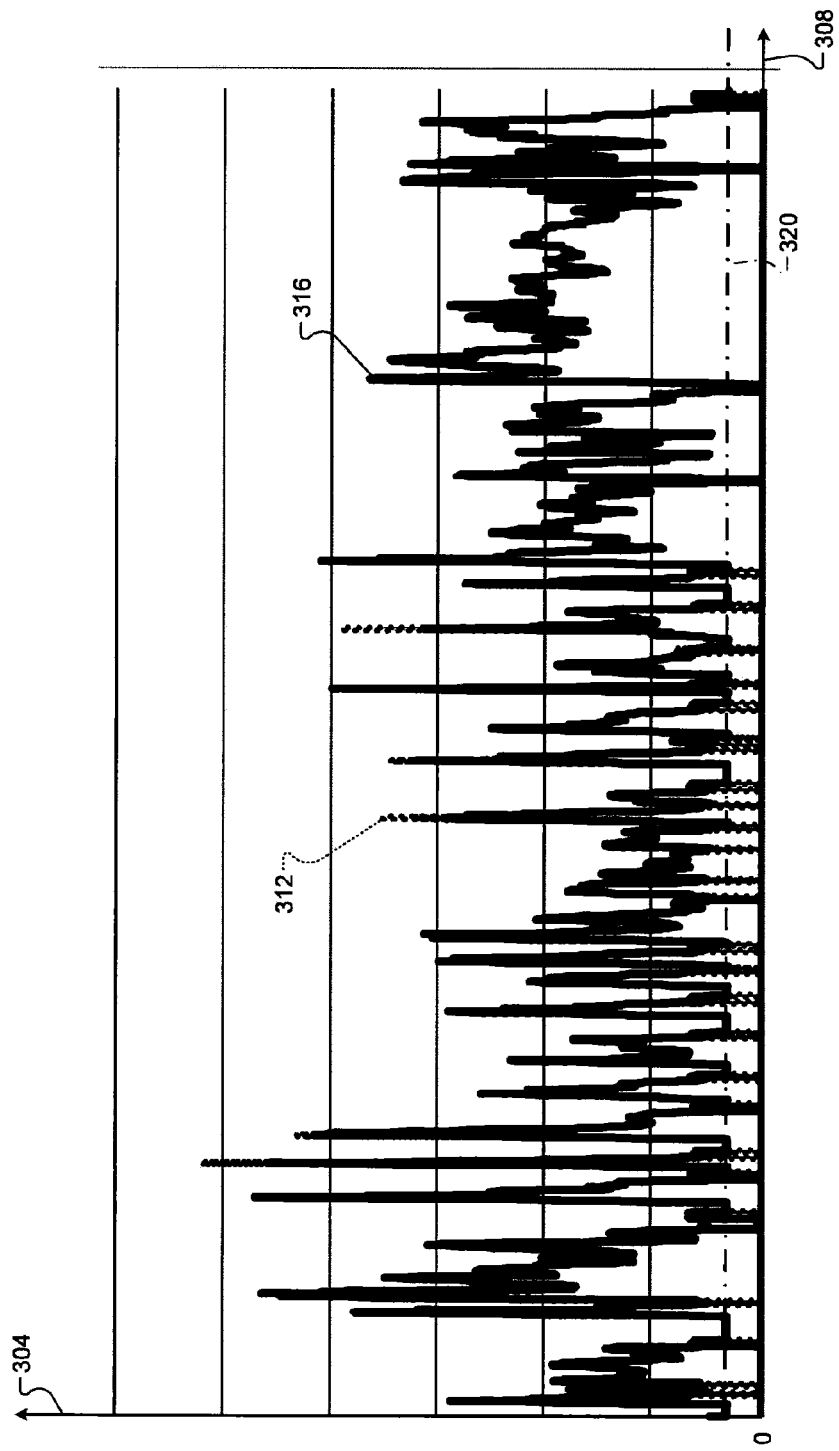
FIG. 3 is an example graph of fueling rate versus time.

Referring now to FIG. 3, an example illustration of fueling rate 304 (e.g., in grams per second) as a function of time 308 (e.g., seconds) during predetermined drive cycles is presented. For example only, the predetermined drive cycles are Federal Test Procedure (FTP).

Example dashed trace 312 tracks the fueling rate 304 where the ECM 130 selectively performs DFCO, but does not operate in the RN mode. As shown, during operation in DFCO, the actuator control module 224 disables fueling to the engine 102 and reduces the fueling rate 304 to zero. Example solid trace 316 tracks the fueling rate 304 where the ECM 130 selectively performs DFCO and, when DFCO cannot be performed, the actuator control module 224 may operate the engine actuators in the RN mode.

In contrast with operation in DFCO, the actuator control module 224 controls the engine actuators to achieve the desired RPM 248 during operation in the RN mode. As stated above, controlling the engine actuators to achieve the desired RPM 248 allows the actuator control module 224 to reduce the fueling rate to approximately the predetermined minimum fueling rate. Example line 320 corresponds to the predetermined minimum fueling rate.

Referring back to FIG. 2, the RN enabling/disabling module 240 sets the state of the RN signal 244 based on the DFCO signal 228. For example only, when the DFCO signal 228 is in an active state, the RN enabling/disabling module 240 may set the RN signal 244 to an inactive state. When the DFCO signal 228 is in the inactive state, however, the RN enabling/disabling module 240 may selectively set the RN signal 244 to the active state.

When the DFCO signal 228 is in the inactive state (i.e., when the DFCO module 232 has determined to not perform DFCO), the RN enabling/disabling module 240 may set the RN signal 244 to the active state when one or more RN mode conditions are satisfied. For example only, the RN enabling/disabling module 240 may set the RN signal 244 to the active state when a gear 250 engaged within the DCT 122 is greater than a predetermined gear. The predetermined gear may be the fourth gear or another suitable gear. In various implementations, the gear 250 and the predetermined gear may be expressed as gear ratios. The gear 250 may be provided by the TCM 180, determined based on one or more measured parameters (e.g., ratio of transmission input shaft speed to transmission output shaft speed), or obtained in another suitable manner.

Additionally or alternatively, the RN enabling/disabling module 240 may set the RN signal 244 to the active state when the APP 212 is greater than a predetermined position. For example only, the predetermined position may be between approximately 1 percent (%) and approximately 2% or another suitable value or another suitable percentage, where the percentage corresponds to how far the accelerator pedal is depressed relative to its predetermined resting position (0%).

Additionally or alternatively, the RN enabling/disabling module 240 may set the RN signal 244 to the active state when the mode of operation 252 of the vehicle selected via the mode selector 150 is in the first mode (i.e., normal mode). The actuator control module 224 controls the engine actuators to increase fuel efficiency at the cost of performance during operation in the first mode relative to operation in the second mode (i.e., the sport mode).

Additionally or alternatively, the RN enabling/disabling module 240 may set the RN signal 244 to the active state when the position 254 of the PRNDL 170 is in the drive position. Additionally or alternatively, the RN enabling/disabling module 240 may set the RN signal 244 to the active state when a vehicle acceleration 256 is within a predetermined range. For example only, the range may be from approximately +0.05 g (meters per second squared or m/s$^2$) to between approximately −0.3 g and −0.5 g or another suitable range. The vehicle acceleration 256 may be, for example, provided by a sensor (e.g., an accelerometer) or obtained in another suitable manner. The predetermined range may be selected to allow operation in the RN mode during a typical vehicle deceleration event, but prevent operation of the RN mode during a more rapid vehicle deceleration event.

Additionally or alternatively, the RN enabling/disabling module 240 may set the RN signal 244 to the active state when the torque request 208 is less than a predetermined torque. For example only, the predetermined torque may be between approximately 1 Newton-meter (Nm) and approximately 2 Nm or another suitable value.

Stated another way, the RN enabling/disabling module 240 may set (transition) the RN signal 244 to the active state when the DFCO signal 228 is in the inactive state and one, more than one, or all of the following are satisfied:
(1) the gear 250 is less than the predetermined gear;
(2) the APP 212 is less than the predetermined position;
(3) the mode 252 is set to the first mode;
(4) the position 254 of the PRNDL 170 is the drive position;
(5) the vehicle acceleration 256 is within the predetermined range; and
(6) the torque request 208 is less than the predetermined torque.

Before setting the RN signal 244 to the active state, the RN enabling/disabling module 240 may also verify that no faults and/or errors have been flagged in conjunction with one or more of the vehicle speed 216, the APP 212, the vehicle acceleration 256, the position 254 of the PRNDL 170, the torque request 208, the gear 250, and/or the DFCO signal 228. If one or more faults and/or errors have been flagged, the RN enabling/disabling module 240 may set the RN signal 244 to the inactive state.

Additionally, the RN enabling/disabling module 240 may wait to receive an RN mode entry signal 260 before setting the RN signal 244 to the active state. The RN enabling/disabling module 240 may generate an RN mode entry request 264 when the DFCO signal 228 is in the inactive state and one, more than one, or all of the above conditions (1-6 and no faults and/or errors) are satisfied. The RN mode entry request 264 may be transmitted to the TCM 180. When the RN mode entry request 264 is received, the TCM 180 may determine whether to honor the RN mode entry request 264 and decouple the DCT 122 from the engine 102.

The TCM 180 generates the RN mode entry signal 260 when the TCM 180 decides that it will disengage the first and second clutches and decouple the DCT 122 from the engine 102 for operation in the RN mode. If the RN enabling/disabling module 240 receives the RN mode entry signal 260 within a predetermined period after generating the RN mode entry request 264, the RN enabling/disabling module 240 may set the RN signal 244 to the active state. If the RN enabling/disabling module 240 does not receive the RN mode entry signal 260 within the predetermined period after generating the RN mode entry request 264, the RN enabling/disabling module 240 may maintain the RN signal 244 in the inactive state.

As stated above, the actuator control module 224 controls the engine actuators based on the desired RPM 248 when the RN signal 244 is in the active state. The desired RPM 248 may be based on a predetermined speed, such as an idle RPM. For example only, the predetermined speed may be approximately 400 rpm to approximately 700 rpm.

The RN enabling/disabling module 240 transitions the RN signal 244 (from the active state) to the inactive state to exit operation in the RN mode. The RN enabling/disabling module 240 may maintain the RN signal 244 in the inactive state (when the RN signal 244 is presently in the inactive state) or transition the RN signal 244 to the inactive state (when the RN signal 244 is presently in the active state) when one or more of the following are satisfied:
(7) the DFCO signal 228 is in the active state;
(8) the gear 250 is not less than the predetermined gear;
(9) the APP 212 is not less than the predetermined position;
(10) the mode 252 is the second mode;
(11) the position 254 of the PRNDL 170 is the reverse, park, neutral, or a forward drive position;
(12) the vehicle acceleration 256 is outside of the predetermined range; and
(13) the torque request 208 is not less than the predetermined torque.

Additionally or alternatively, when the RN signal 244 is in the active state, the RN enabling/disabling module 240 may transition the RN signal 244 to the inactive state when a vehicle speed increase is greater than a predetermined speed increase. The vehicle speed increase may be determined based on the vehicle speed 216 and an initial vehicle speed 268.

An initial vehicle speed module 272 receives the vehicle speed 216. When the RN enabling/disabling module 240 generates the RN mode entry request 264, the initial vehicle speed module 272 sets the initial vehicle speed 268 equal to the vehicle speed 216. In this manner, the initial vehicle speed 268 corresponds to the vehicle speed 216 when the RN enabling/disabling module 240 requests that the TCM 180 decouple the DCT 122 from the engine 102 for operation in the RN mode.

The vehicle speed increase may therefore indicate how much the vehicle speed 216 has increased since the RN enabling/disabling module 240 requested the TCM 180 to decouple the DCT 122 from the engine 102 for operation in the RN mode. If one or more forces (e.g., gravity when the vehicle is traveling in a forward direction down a decline) cause the vehicle speed increase to be greater than the predetermined speed increase, the RN enabling/disabling module 240 may exit operation of the engine 102 in the RN mode. The RN enabling/disabling module 240 may exit operation of the engine 102 in the RN mode, for example, to make operation in DFCO available if the vehicle speed 216 becomes greater than the predetermined speed and the other DFCO enabling conditions are satisfied.

When the RN signal 244 transitions from the active state to the inactive state, the TCM 180 generates the desired RPM 248 based on the vehicle speed 216 and the gear ratio. The gear ratio may be determined based on the gear ratio that will be engaged when the first or second clutch is engaged to re-couple the DCT 122 and the engine 102 and one or more other gear ratio changes implemented between the engine 102 and the wheels of the vehicle.

The TCM 180 generates the desired RPM 248 to synchronize (e.g., match) the engine speed (RPM) with rotational speed of the transmission input shaft when the first or second clutch is engaged to re-couple the DCT 122 and the engine 102. For example only, at a given gear ratio, the TCM 180 may increase the desired RPM 248 as the vehicle speed 216 increases and vice versa. At a given value of the vehicle speed 216, the TCM 180 may increase the desired RPM 248 as the gear ratio decreases (e.g., 3.0:1 to 2.0:1) and vice versa. The actuator control module 224 may gradually transition control of the engine actuators from based on the desired RPM 248 to based on the torque request 208 after the RN signal 244 transitions from the active state to the inactive state.

The TCM 180 may selectively adjust the desired RPM 248 further based on a period until stop 286. The period until stop 286 corresponds to a period between a present time and a time when the driver will likely bring the vehicle to a stop for an object that is in a path of the vehicle or a predetermined stopping location that is in a path of the vehicle. For example only, when the period until stop 286 increases, the TCM 180 may increase the desired RPM 248. The period until stop 286 may increase, for example, when an object that is in the path of the vehicle begins to move away from the vehicle. Increasing the desired RPM 248 when the period until stop 286 increases may enable the driver to accelerate as desired.

Figure 4:
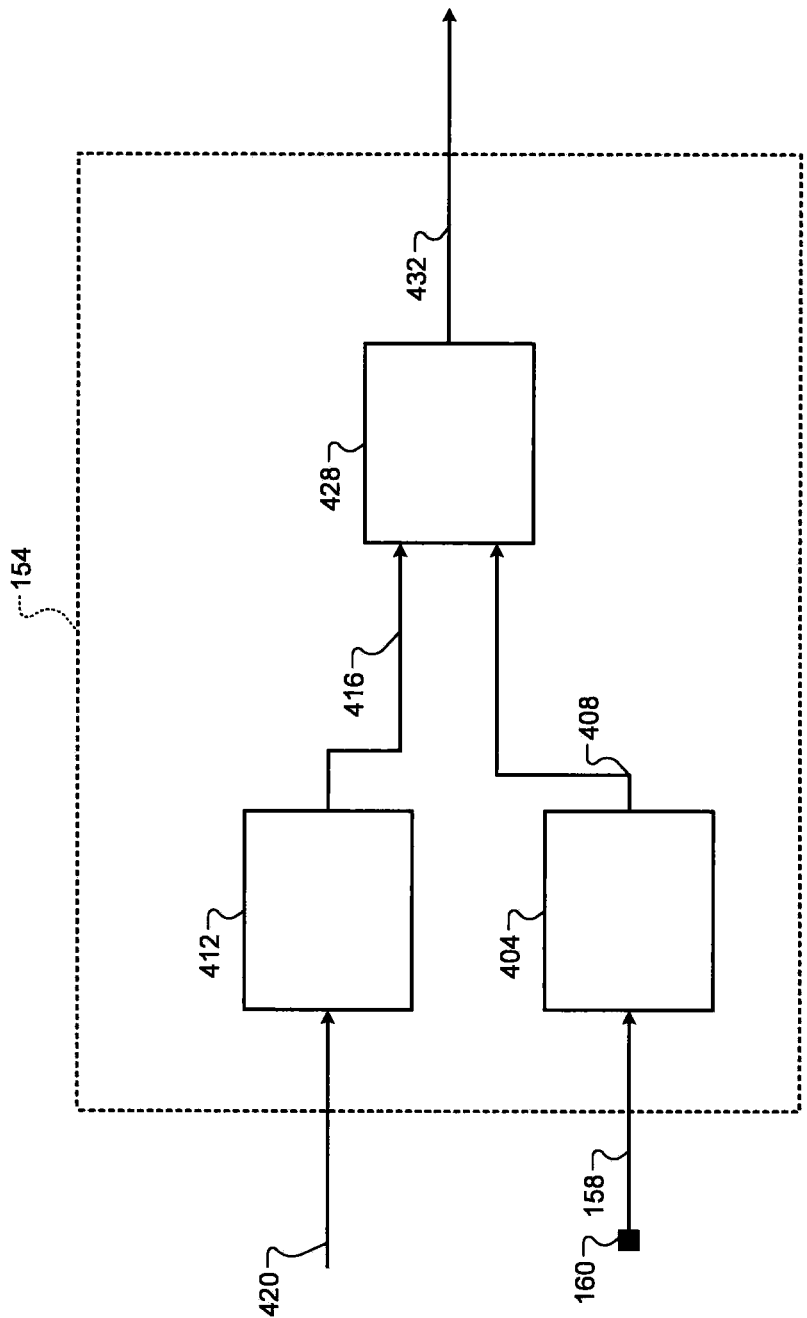
FIG. 4 is a functional block diagram of an example cruise control module according to the present disclosure.

Referring now to FIG. 4, a functional block diagram of an example implementation of the cruise control module 154 is presented. An object identification module 404 identifies objects that are in front of, behind, and/or beside the vehicle based on the reflected signals from the transceivers 160. The object identification module 404 may identify objects that extend to at least a predetermined distance above the surface of the road in various implementations. The object identification module 404 outputs object location data 408 that indicates the locations of one or more objects that are in front of, behind, and/or beside the vehicle with respect to the location of the vehicle.

A path determination module 412 determines a path 416 of the vehicle on the road based on one or more inputs. For example only, the path determination module 412 may determine the path 416 of the vehicle based on imaging data 420 captured via the imaging devices 168. The path determination module 412 may additionally or alternatively determine the path 416 of the vehicle based reflected signals from one or more of the transceivers 160 and/or one or more other suitable inputs. The path 416 of the vehicle may refer to a portion of the road (e.g., a lane) that the vehicle may occupy in the future if the driver maintains the current orientation of the vehicle on the road.

A first distance determination module 428 may receive the object location data 408 and the path 416. The first distance determination module 428 determines whether one or more of objects identified by the object identification module 404 indicated in the object location data 408 are located in the path 416 of the vehicle. The first distance determination module 428 determines a first distance 432 between the vehicle and an object that is located in the path 416 of the vehicle. In various implementations, the first distance determination module 428 may determine a distance between the vehicle and an object that is located in the path 416 of the vehicle for each object that is located in the path 416 of the vehicle.

The first distance determination module 428 may compare the distances and set the first distance 432 equal to a smallest one of the distances. In other words, the first distance determination module 428 may set the first distance 432 equal to the distance between the vehicle and the closest one of the objects in the path 416 of the vehicle. The first distance 432 may correspond to a traveling distance of the vehicle along the path 416 (as opposed to a straight line path) between the vehicle and the closest one of the objects in the path 416 of the vehicle. The period until stop 286 may be determined based on the first distance 432.

Figure 5:
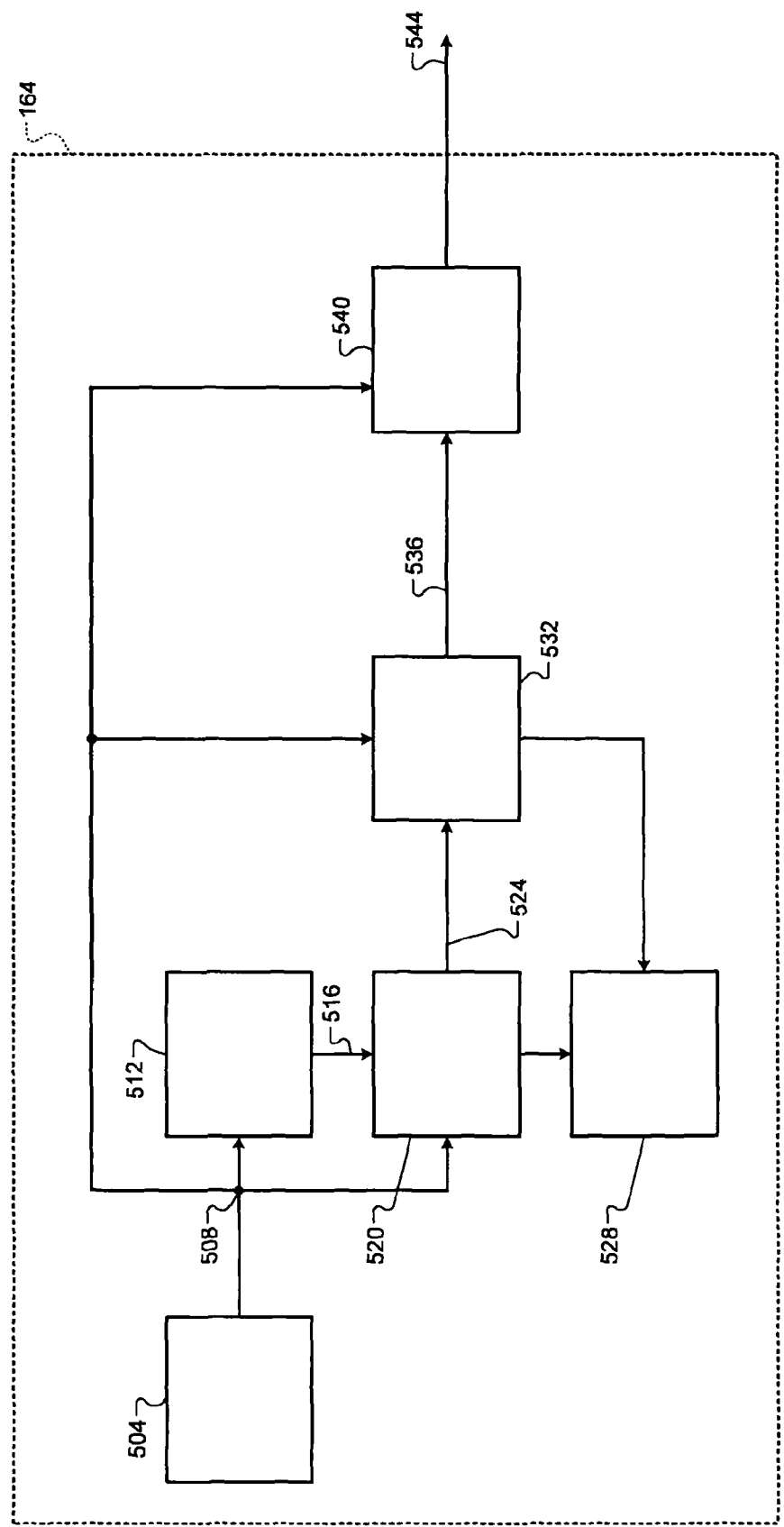
FIG. 5 is a functional block diagram of an example navigation module according to the present disclosure.

Referring now to FIG. 5, a functional block diagram of an example implementation of the navigation module 164 is presented. A GPS module 504 may determine a location 508 of the vehicle based on signals from a plurality of satellites (not shown). For example only, the location 508 may include a latitudinal and longitudinal coordinate of the vehicle or another suitable indicator of the location of the vehicle.

A heading determination module 512 may identify a heading 516 of the vehicle based on the location 508. For example only, the heading determination module 512 may identify the heading 516 based on the present value of the location 508 and one or more previous values of the location 508.

A path determination module 520 may determine a second path 524 of the vehicle on the road based on the location 508. The path determination module 520 may determine the second path 524 of the vehicle further based on the heading 516, pre-stored roadway data, and/or one or more other suitable parameters. The pre-stored roadway data may be stored in a memory 528 of the vehicle or in another suitable location. The pre-stored roadway data may include locations of identified roads in a particular area of the world (e.g., a country), the entire world, or another suitable area. The second path 524 of the vehicle may refer to a portion of the road (e.g., a lane) that the vehicle may occupy in the future.

A stopping location determination module 532 determines a stopping location 536 of the vehicle. The stopping location 536 may correspond to a location where the driver may stop the vehicle in the future if the second path 524 is followed. The stopping location determination module 532 may also determine one or more additional stopping locations. The stopping location 536 may be a closest location to the present value of the location 508 where the driver may stop the vehicle in the future if the second path 524 is followed. The stopping location determination module 532 may determine the stopping location 536 using a mapping of pre-stored stopping locations indexed by location.

For example only, the mapping of pre-stored stopping locations may be stored in the memory 528. The pre-stored stopping locations may include, for example, locations of stop signs, locations of yield signs, and locations of other places where drivers of vehicles are to stop the vehicle. The stopping location determination module 532 may determine the stopping location 536 using the mapping of pre-stored stopping locations based on the location 508 and the second path 524 of the vehicle. The stopping location 536 may correspond to the closest location to the location 508 that is in the second path 524 of the vehicle where the driver should stop the vehicle.

A second distance determination module 540 may determine a second distance 544. The second distance determination module 540 determines the second distance 544 between the vehicle and the stopping location 536. The second distance 544 may correspond to a traveling distance of the vehicle along the second path 524 (as opposed to a straight line path) where the driver should stop the vehicle. The period until stop 286 may be determined based on the second distance 544.

Figure 6:
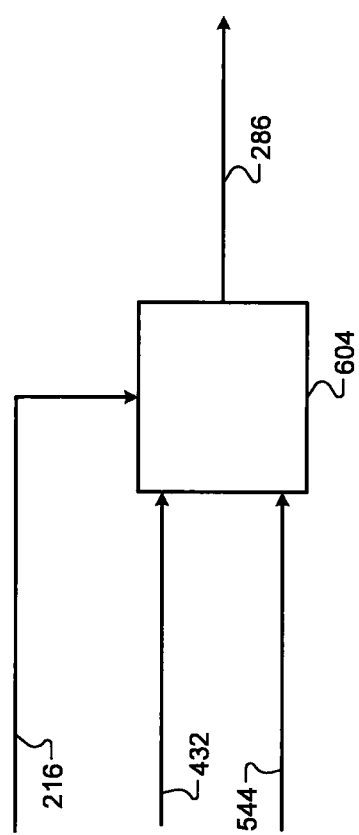
FIG. 6 is a functional block diagram of an example period determination module according to the present disclosure.

Referring now to FIG. 6, a functional block diagram of an example implementation of a period determination module 604 is presented. For example only, the period determination module 604 may be implemented within the ECM 130, within another module, or independently.

The period determination module 604 may receive the first and second distances 432 and 544. As described above, the first distance 432 may correspond to a distance between the vehicle and a closest object that is in the path 416 of the vehicle. The second distance 544 may correspond to a distance between the vehicle and closest pre-stored stopping location that is in the second path 524 of the vehicle.

The period determination module 604 may select one of the first and second distances 432 and 544. For example only, the period determination module 604 may select the one of the first and second distances 432 and 544 that is smaller (i.e., closer to the location of the vehicle). The period determination module 604 may determine the period until stop 286 based on the selected one of the first and second distances 432 and 544 and the vehicle speed 216.

For example only, the period determination module 604 may set the period until stop 286 based on or equal to the selected one of the first and second distances 432 and 544 divided by the vehicle speed 216. For example only, the period determination module 604 may set the period until stop 286 based on or equal to 2 times the selected one of the first and second distances 432 and 544 divided by the vehicle speed 216. The period determination module 604 may also determine a period until stop for the other one of the first and second distances 432 and 544 in various implementations.

Figure 7:
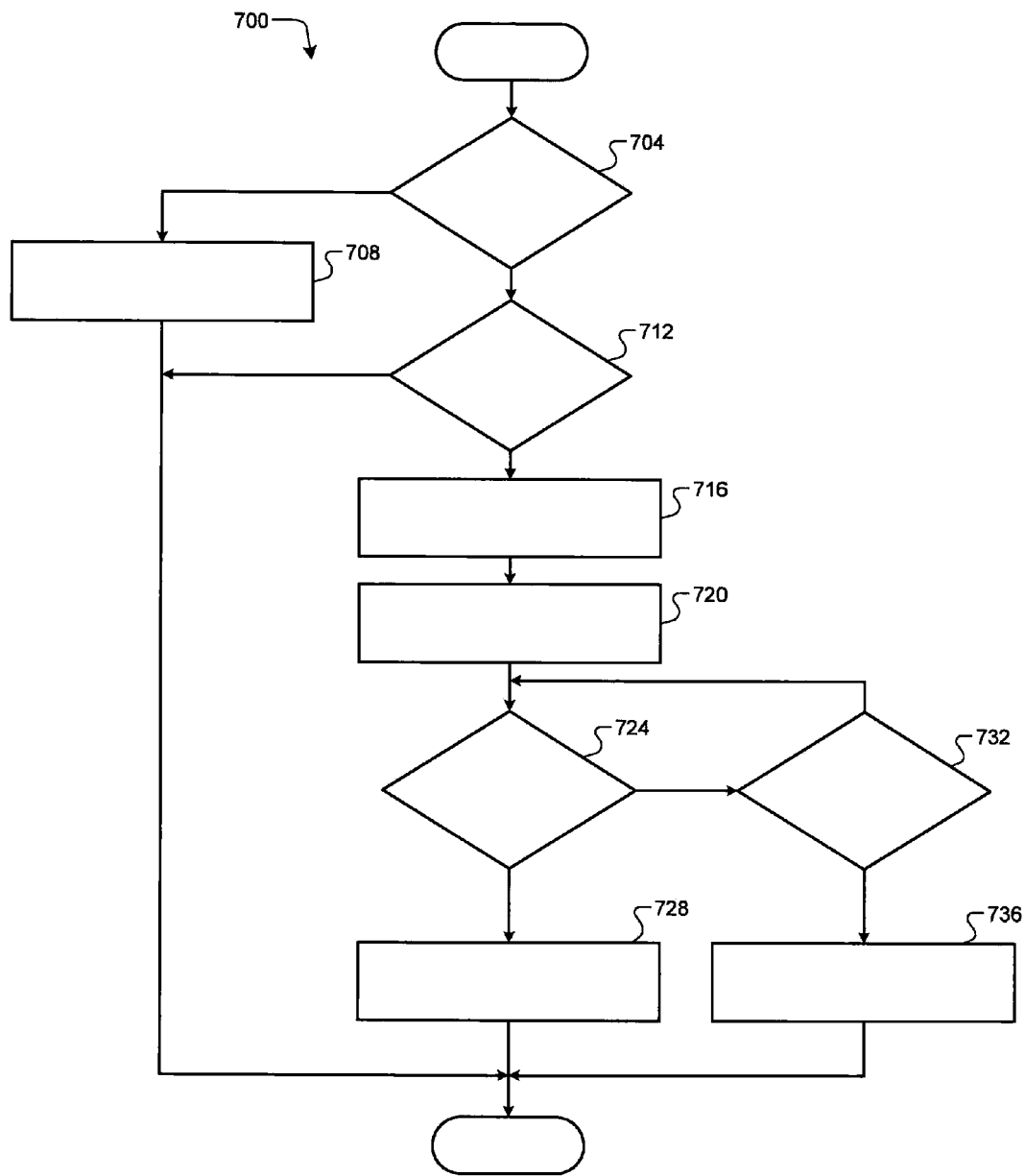
FIG. 7 is a flowchart of an example method of entering a rolling neutral (RN) mode and controlling engine actuators according to the present disclosure.

Referring now to FIG. 7, a flowchart depicting an example method 700 of entering the RN mode and controlling the engine actuators is presented. Control may begin with 704 where control determines whether to enable DFCO. If true, control disables the provision of fuel to the engine 102 and maintains the DCT 122 coupled to the engine 102 at 708 and control may end. If false, control may continue with 712.

At 712, control may determine whether to generate the RN mode entry request 264. If true, control generates the RN mode entry request 264 and start a timer at 716. If false, control may end. For example only control may generate the RN mode entry request 264 when the DFCO signal 228 is in the inactive state and one, more than one, or all of the following are satisfied:
(1) the gear 250 is less than the predetermined gear;
(2) the APP 212 is less than the predetermined position;
(3) the mode 252 is set to the first mode;
(4) the position 254 of the PRNDL 170 is the drive position;
(5) the vehicle acceleration 256 is within the predetermined range; and
(6) the torque request 208 is less than the predetermined torque.

Control may set the initial vehicle speed 268 equal to the vehicle speed 216 at 720. Control may determine whether the RN mode entry signal 260 has been received from the TCM 180 at 724. If true, control may transition the RN signal 244 to the active state and begin controlling the engine actuators (and therefore the fueling rate) based on the desired RPM 248 at 728. If false, control may transfer to 732.

At 732, control may determine whether the timer is greater than a predetermined period. If false, control may allow the timer to continue running and return to 724; if true, control may set the RN signal 244 to the inactive state at 736 and control may end. In this manner, control may timeout if the RN mode entry signal 260 is not received within the predetermined period after control generates the RN mode entry request 264.

Figure 8:
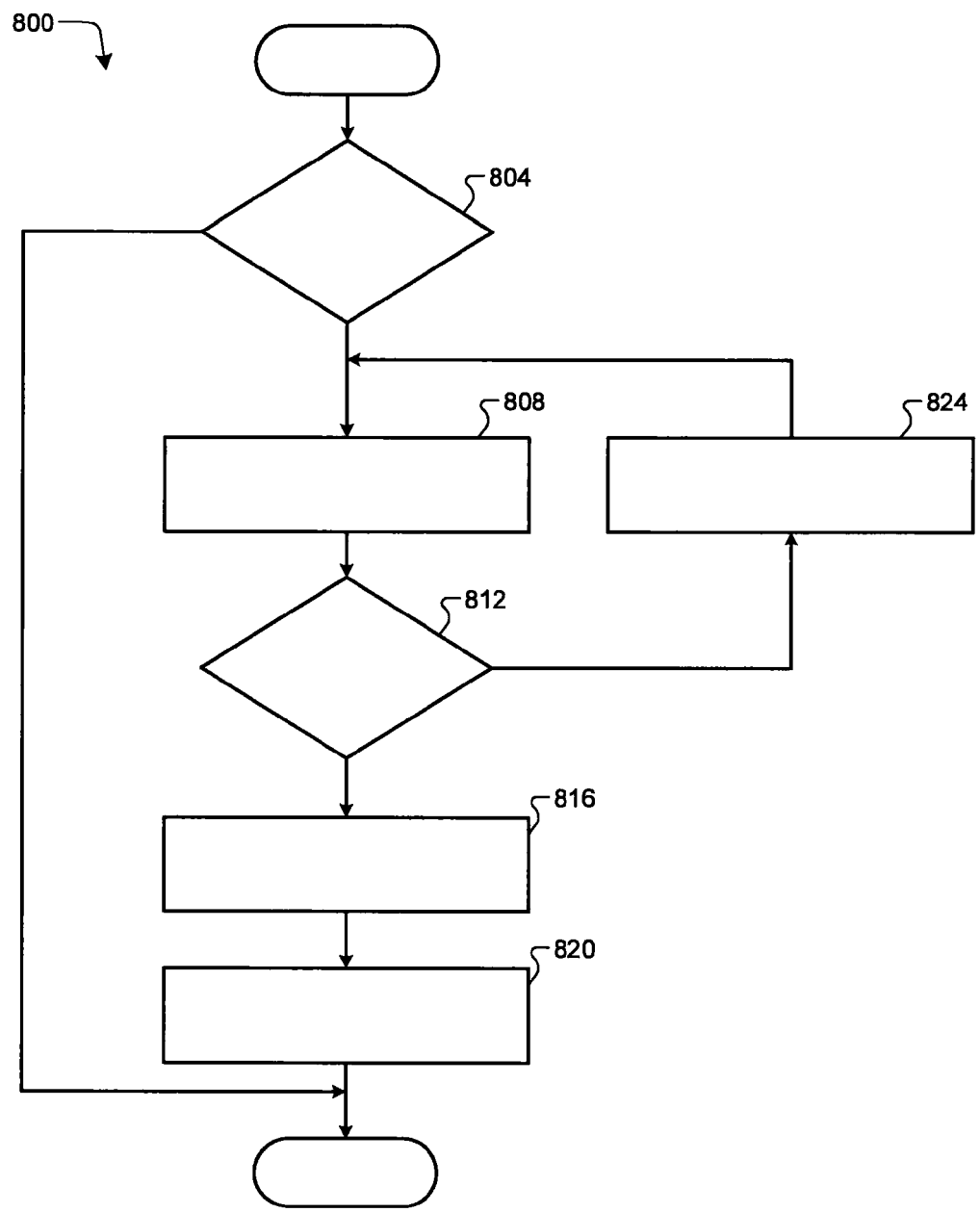
FIG. 8 is a flowchart of an example method of exiting the RN mode and controlling engine actuators according to the present disclosure.

Referring now to FIG. 8, a flowchart depicting an example method 800 of exiting the RN mode and controlling engine actuators is presented. Control may begin with 804 where control determines whether the RN signal 244 is in the active state. If true, control may end; if false, control may continue with 808. At 808, control may determine the vehicle speed increase based on the difference between the vehicle speed 216 and the initial vehicle speed 268.

At 812, control may determine whether to exit the RN mode. If true, control may transition the RN signal 244 from the active state to the inactive state at 816 and transition control of the engine actuators to being based on the torque request 208 at 820. If false, control may control the engine actuators based on the desired RPM 248 at 824 and return to 808. For example only, control may exit the RN mode when at least one of the following is satisfied:
(7) the DFCO signal 228 is in the active state;
(8) the gear 250 is not less than the predetermined gear;
(9) the APP 212 is not less than the predetermined position;
(10) the mode 252 is the second mode;
(11) the position 254 of the PRNDL 170 is the reverse, park, neutral, or a forward drive position;
(12) the vehicle acceleration 256 is outside of the predetermined range; and
(13) the torque request 208 is not less than the predetermined torque.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
an engine control module comprising:
a deceleration fuel cutoff (DFCO) module that determines whether to disable provision of fuel to an engine when a vehicle speed is greater than zero and that selectively generates a DFCO signal based on the determination;
an actuator control module that disables the provision of fuel to the engine when the DFCO signal is generated; and
a rolling neutral (RN) module that selectively generates an RN mode signal in response to a determination that the DFCO module is not generating the DFCO signal, wherein the actuator control module controls the provision of fuel to the engine based on a desired engine speed when the RN mode signal is generated; and
a transmission control module that disengages first and second input clutches of a dual clutch transmission (DCT) to decouple the DCT from the engine when the RN mode signal is generated.

2. The system of claim 1 wherein the RN module generates the RN mode signal when the DFCO module is not generating the DFCO signal and a park, reverse, neutral, drive lever (PRNDL) is in a drive position.

3. The system of claim 1 wherein the RN module generates the RN mode signal when the DFCO module is not generating the DFCO signal and an accelerator pedal position is less than a predetermined position.

4. The system of claim 1 wherein the RN module generates the RN mode signal when the DFCO module is not generating the DFCO signal and a gear selected within the DCT is less than a predetermined gear.

5. The system of claim 1 wherein the RN module generates the RN mode signal when the DFCO module is not generating the DFCO signal and an acceleration of the vehicle is within a predetermined range.

6. The system of claim 1 further comprising a torque request module that generates a torque request based on an accelerator pedal position and the vehicle speed,
   wherein the RN module generates the RN mode signal when the DFCO module is not generating the DFCO signal and the torque request is less than a predetermined torque.

7. The system of claim 1 further comprising a torque request module that generates a torque request based on an accelerator pedal position and the vehicle speed,
   wherein the RN module generates the RN mode signal when the DFCO module is not generating the DFCO signal and at least two of:
   the torque request is less than a predetermined torque;
   a gear selected within the DCT is less than a predetermined gear;
   the accelerator pedal position is less than a predetermined position;
   a park, reverse, neutral, drive lever (PRNDL) is in a drive position; and
   an acceleration of the vehicle is within a predetermined range.

8. The system of claim 1 further comprising a torque request module that generates a torque request based on an accelerator pedal position and the vehicle speed,
   wherein the RN module generates the RN mode signal when the DFCO module is not generating the DFCO signal, the torque request is less than a predetermined torque; a gear selected within the DCT is less than a predetermined gear; the accelerator pedal position is less than a predetermined position; a park, reverse, neutral, drive lever (PRNDL) is in a drive position; and an acceleration of the vehicle is within a predetermined range.

9. The system of claim 1 wherein the RN module stops generating the RN mode signal when an increase in the vehicle speed while the RN mode signal is generated is greater than a predetermined speed increase,
   wherein the transmission control module selectively engages one of the first and second input clutches of the DCT when the RN module stops generating the RN mode signal.

10. The system of claim 9 further comprising a torque request module that generates a torque request based on an accelerator pedal position and the vehicle speed,
    wherein the actuator control module controls the provision of fuel to the engine based on the torque request after the RN module stops generating the RN mode signal.

* * * * *